United States Patent
Kore et al.

(10) Patent No.: US 8,600,732 B2
(45) Date of Patent: Dec. 3, 2013

(54) TRANSLATING PROGRAMMING CONTENT TO MATCH RECEIVED VOICE COMMAND LANGUAGE

(75) Inventors: Gurubasappa Kore, Bangalore (IN); Vikal Kumar Jain, Karnataka (IN); Trinadha Harish Babu Pallapothu, Chirala (IN)

(73) Assignee: Sling Media Pvt Ltd, Bangalore (IN)

( * ) Notice: Subject to any disclaimer, the term of this patent is extended or adjusted under 35 U.S.C. 154(b) by 355 days.

(21) Appl. No.: 12/941,857

(22) Filed: Nov. 8, 2010

(65) Prior Publication Data
US 2012/0116748 A1 May 10, 2012

(51) Int. Cl.
*G06F 17/20* (2006.01)
*G06F 17/28* (2006.01)

(52) U.S. Cl.
USPC ........................................ 704/8; 704/2; 704/3

(58) Field of Classification Search
USPC ........................ 704/270–277, 3–8
See application file for complete search history.

(56) References Cited

U.S. PATENT DOCUMENTS

| | | | | | |
|---|---|---|---|---|---|
| 5,880,788 | A | * | 3/1999 | Bregler | 348/515 |
| 6,112,177 | A | * | 8/2000 | Cosatto et al. | 704/260 |
| 6,243,675 | B1 | * | 6/2001 | Ito | 704/232 |
| 6,330,023 | B1 | * | 12/2001 | Chen | 348/14.13 |
| 6,492,990 | B1 | * | 12/2002 | Peleg et al. | 345/473 |
| 7,145,606 | B2 | * | 12/2006 | Haisma et al. | 348/515 |
| 2004/0216049 | A1 | * | 10/2004 | Lewis et al. | 715/531 |
| 2006/0136226 | A1 | * | 6/2006 | Emam | 704/277 |

* cited by examiner

*Primary Examiner* — Jesse Pullias
(74) *Attorney, Agent, or Firm* — Ingrassia Fisher & Lorenz, P.C.

(57) ABSTRACT

One embodiment may take the form of a system for translating an audio stream of programming content. The system may include an apparatus, a processing unit configured to execute a voice recognition algorithm and one or more executable commands, a receiver coupled to the processing unit and configured to receive a voice command in a first language, a communication component coupled to the processing unit and configured to receive programming content including an audio stream in a second language, and one or more storage media storing the voice recognition algorithm. The voice recognition algorithm may be configured to translate the audio stream into a first language if the first language does not match the second language.

19 Claims, 4 Drawing Sheets

TRANSLATING PROGRAMMING CONTENT TO MATCH RECEIVED VOICE COMMAND LANGUAGE

FIELD OF THE INVENTION

Embodiments described herein relate generally to devices for controlling electronic devices and, in particular, to voice control systems for controlling electronic devices.

SUMMARY

The present disclosure discloses systems and methods for voice control. In some embodiments, various voice commands may be received via an audio receiver. The commands may correspond to various user-input controls of a broadcast receiver, such as controls for turning on and turning off the broadcast receiver, changing a channel, displaying text describing the programming content being viewed by a user, and so on and so forth. In one embodiment, the broadcast receiver may execute a voice recognition algorithm to convert the voice commands into text. The voice recognition algorithm may be configured to recognize speech in one language, or may be configured to recognize speech in different languages. Additionally, the broadcast receiver may be configured to recognize the language spoken by a user issuing a voice command, and translate the audio signal of the programming content into the language spoken by a user. In other embodiments, a content retransmitter may execute a voice recognition algorithm to convert the voice commands into text.

One embodiment may take the form of a system for translating an audio stream of programming content. The system may include an apparatus, a processing unit configured to execute a voice recognition algorithm and one or more executable commands, a receiver coupled to the processing unit and configured to receive a voice command in a first language, a communication component coupled to the processing unit and configured to receive programming content including an audio stream in a second language, and one or more storage media storing the voice recognition algorithm. The voice recognition algorithm may be configured to translate the audio stream into a first language if the first language does not match the second language.

Another embodiment may take the form of a method for controlling an electronic device using a voice command. The method may include receiving a first voice command in a first language, receiving programming content including a first audio stream in a second language, determining if the first language matches the second language, and executing a voice recognition algorithm to translate the first audio stream into the first language if the first language does not match the second language.

Another embodiment may take the form of a computer program product that includes a first set of instructions, stored in at least one non-transitory machine-readable medium, executable by at least one processing unit to receive a voice command in a first language from a receiver, and a second set of instructions, stored in the at least one non-transitory machine-readable medium, executable by the at least one processing unit to receive an audio stream in a second language from a communication component. The computer program product may further include a third set of instructions, stored in the at least one non-transitory machine-readable medium, executable by the at least one processing unit to determine whether the first language matches the second language, and a fourth set of instructions, stored in the at least one non-transitory machine-readable medium, executable by the at least one processing unit to translate the audio stream into the first language if the first language does not match the second language.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Many electronic devices, such as televisions, audio receivers, fans, appliances, and so on, rely on remote control devices for user input. However, such remote control devices can easily be misplaced or lost by a user, or may be placed in an inconvenient location for the user to access. Other electronic devices, such as portable electronic devices, such as digital media players, personal digital assistants, mobile phones, and so on, may not utilize remote control devices, but may rely on small buttons and screens for user input. Such controls may be built into the device or part of a touch-screen interface, but are typically very small and can be cumbersome to manipulate. An accurate and reliable voice command system that can execute the functions associated with the user input controls of a device may greatly enhance the functionality and convenience of many electronic devices.

The present disclosure discloses systems and methods for voice control. In some embodiments, various voice commands may be received via an audio receiver. The commands may correspond to various user-input controls of a broadcast receiver, such as controls for turning on and turning off the broadcast receiver, changing a channel, displaying text describing the programming content being viewed by a user, and so on and so forth. In one embodiment, the broadcast receiver may execute a voice recognition algorithm to convert the voice commands into text. The voice recognition algorithm may be configured to recognize speech in one language, or may be configured to recognize speech in different languages. Additionally, the broadcast receiver may be configured to recognize the language spoken by a user issuing a voice command, and translate the audio signal of the programming content into the language spoken by a user. In other embodiments, a content retransmitter may execute a voice recognition algorithm to convert the voice commands into text.

Figure 1:
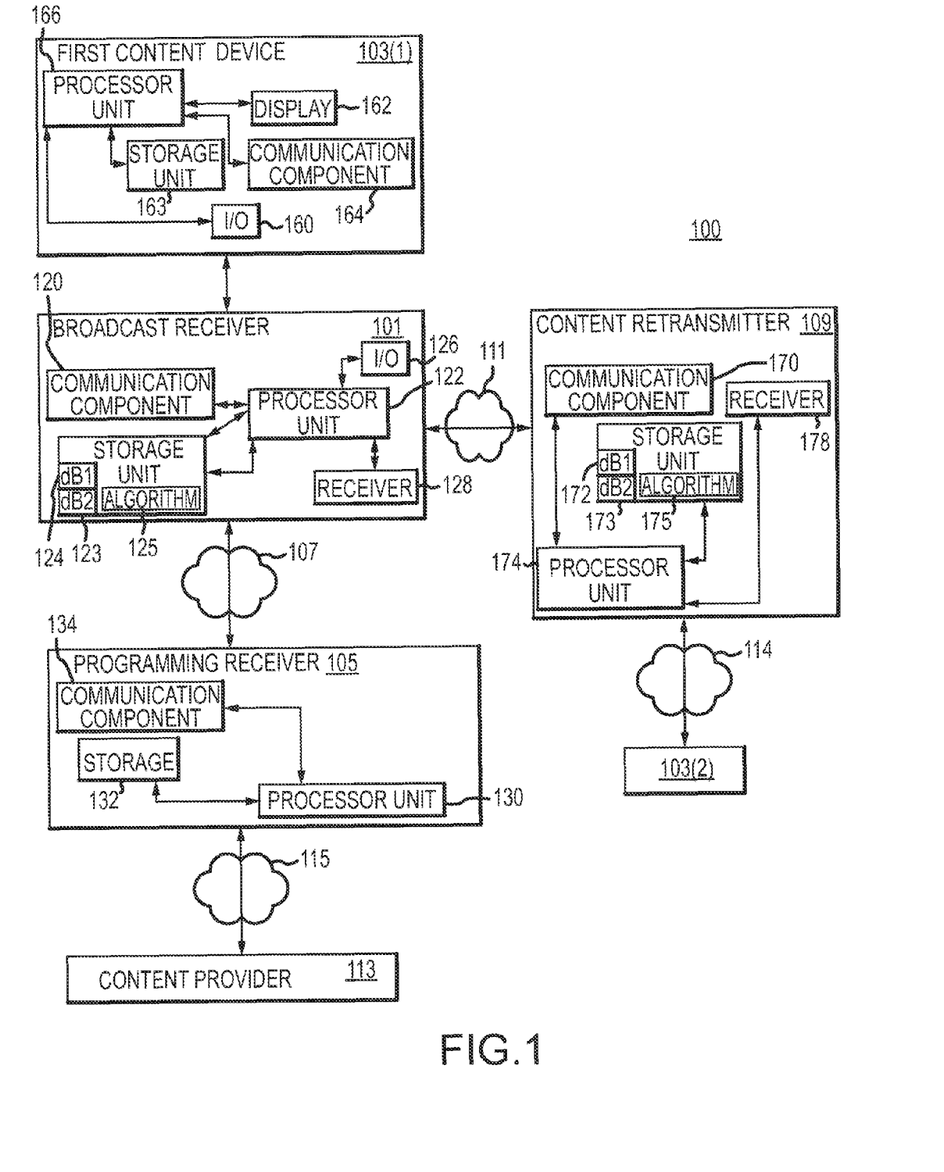
FIG. 1 is a block diagram illustrating a system for authenticated broadcast transmission utilizing metadata verification.

FIG. 1 is a block diagram illustrating a system 100 for voice recognition and feedback. As shown in FIG. 1, the system may include a broadcast receiver 101, a first content device 103(1) communicatively coupled to the broadcast receiver 101, a programming receiver 105 communicatively coupled to the broadcast receiver 101 via one or more transmission media 107 (which may include any kind of wired or wireless transmission media such as a satellite connection, an Internet connection, a cellular connection, a local area network connection, and so on), and a content retransmitter 109 communicatively coupled to the broadcast receiver 101 via one or more transmission media 111 (which may include any kind of wired or wireless transmission media such as a satellite connection, an Internet connection, a cellular connection, a local area network connection, and so on). The content retransmitter 109 may also be communicatively coupled to a second content device 103(2) (or alternatively, to the first content device 103(1) communicatively coupled to the broadcast receiver 101) via one or more transmission media 114 (which may include any kind of wired or wireless transmission media such as a satellite connection, an Internet connection, a cellular connection, a local area network connection, and so on). In some embodiments, the system may further include a content provider 113 that is communicatively coupled to the programming receiver 105 via one or more transmission media 115 (which may include any kind of wired or wireless transmission media such as a satellite connection, an Internet connection, a cellular connection, a local area network connection, and so on).

The broadcast receiver 101 may include one or more processing units 122, one or more storage media 124 (which may be any non-transitory machine-readable storage medium), one or more communication components 120 configured to allow the broadcast receiver 101 to transmit and/or receive signals from the programming receiver 105, and one or more input/output components 126 configured to allow the broadcast receiver 101 to transmit and/or receive signals from the content device 103. Additionally, the broadcast receiver 101 may include a receiver 128, such as an audio receiver, that may be configured to receive voice commands from a user. In one embodiment, the receiver may be a microphone.

The content device 103 (such as a laptop computing device, a tablet computer device, a television, a cellular telephone, and so on) may include one or more input/output components 160 to transmit and/or receive signals from the broadcast receiver 101, one or more communication components 164 to transmit and/or receive signals from the content retransmitter 109, one or more storage media 163 (which may be any non-transitory machine-readable storage medium), one or more processing units 166, and one or more display devices 162.

The programming receiver 105 may include one or more processing units 130, one or more storage media 132, and one or more communication components 134 configured to allow the programming receiver 105 to transmit and/or receive signals from the broadcast receiver 101 and/or the content provider 113 via one or more transmission media 107, 115.

The content retransmitter 109 may include one or more communication components 170 to transmit and/or receive signals from the second content device 103(2) and the broadcast receiver 101 via one or more transmission media 114, as well as one or more storage media 172 and one or more processing units 174. The content retransmitter 109 may further include a receiver 178, such as an audio receiver, that may be configured to receive voice commands from a user. In one embodiment, the receiver may be a microphone.

The broadcast receiver 101 may be any kind of broadcast receiver, such as a set top box, a cable box, a television receiver, a digital video recorder, a cellular telephone, a laptop computer, a desktop computer, a mobile computer, and so on. The broadcast receiver 101 may be operable to receive programming content (such as one or more television programs, movies, video on demand programs, images, audio, an so on) from one or more programming receivers 105 via one or more transmission media 107. The processing unit 122 of the broadcast receiver 101 may execute instructions stored in the storage medium 124 in order to store the received programming content in the storage medium, process the received programming content for display on an associated content device 103(1), and so on.

Each programming receiver 105, such as one or more satellite television providers, cable television providers, Internet service providers, video on demand providers, and so on, may be operable to receive programming content from one or more content providers 113 via one or more transmission media 115 (such as one or more satellite communication links, coaxial cable transmission links, cellular communication links, Internet communication links, an so on). The processing unit 130 of the programming receiver 105 may execute instructions stored in the storage medium 132 in order to transmit the programming content to the broadcast receiver 101.

The content retransmitter 109 may be operable to receive programming content (such as one or more television programs, movies, and so on) from the broadcast receiver 101, and to retransmit the content in a unicast fashion to an associated content device 103(2). The content device 103(2) may, in turn, be configured to display the content to a user. As alluded to above, the programming content received from the broadcast receiver 101 may be transmitted by the programming receiver 105 to the broadcast receiver 101. The user may then use a player application on the associated content device 103(2) to connect to the content retransmitter 109 via one or more transmission media 114 and view the programming content, essentially enabling viewing of the programming content remote from the broadcast receiver 101.

In one embodiment, the processing unit 122 of the broadcast receiver 101 may execute instructions stored in the one or more storage media 124 in order to receive spoken voice commands from a user through the receiver 128 and store the voice commands in the storage media 124. Additionally, the processing unit 122 of the broadcast receiver 101 may execute a voice or speech recognition algorithm 125 stored in the one or more storage media 124 in order to recognize the spoken commands received from the receiver 128. In one embodiment, the speech recognition algorithm 125 may be in the form of software or firmware that deciphers spoken words and converts the words into text. For example, the algorithm 125 can be a data structure, such as a neural network or a decision tree, and may be based on various features of the user's speech, such as the frequency fluctuation of the user's voice, the duration of various frequencies of the user's voice, and/or patterns in variances in frequency as the user speaks.

Upon converting the spoken voice commands into text, the processing unit 122 may execute instructions stored in the storage medium 124 in order to associate each voice command with one or more executable commands. The executable commands may correspond to various user-input controls of the broadcast receiver 101 and/or any content devices 103(1) connected to the broadcast receiver 101. For illustration purposes only, one example of a user-input control may be a control to turn on the broadcast receiver 101, which may correspond to a sequence of executable commands for turning on the broadcast receiver 101 and/or content device 113. As another example, the user-input control may be a channel changing control, which may correspond to a sequence of executable commands for changing channels on the broadcast receiver 101. In one embodiment, the interpreted voice commands (which can be a text file) and associated executable commands may be stored as one or more relational databases 123 (such as, but not limited to, a look-up table) in the one or more storage media 124.

Upon receiving a voice command, the processing unit 122 may execute the speech recognition algorithm 125 in order to derive executable commands that can be executed by the processing unit 122 of the broadcast receiver 101. Additionally, the processing unit 122 may execute instructions stored in the storage medium 172 in order to transmit the executable commands to a connected content device 113(1), which may, in turn, execute the received executable commands. In another embodiment, the processing unit 122 may execute the speech recognition algorithm 125 in order to derive executable commands that may be executed by the content retransmitter 109, and may further transmit the executable commands to the content retransmitter 109, which may execute the commands.

The content retransmitter 109 may be also be configured to accept and process voice commands from users. For example, the processing unit 174 of the content retransmitter 109 may execute instructions stored in the one or more storage media 172 in order to receive spoken voice commands through the receiver 178 and store the voice commands in the one or more storage media 172. Additionally, the processing unit 174 of the content retransmitter 109 may execute a voice recognition algorithm 175 stored in the one or more storage media 174 in order to convert the spoken commands received from the receiver 178 into text. The speech recognition algorithm 175 may be substantially similar or identical to that described above with respect to the broadcast receiver 101. The processing unit 174 of the content retransmitter 109 may further be configured to associate the interpreted voice commands (which may be in text format) with one or more executable commands, and store the interpreted voice commands and executable commands in one or more relational databases 173 in the one or more storage media 172. The executable commands may correspond to various user-input controls of the content retransmitter 109 and/or any broadcast receivers 101 communicatively coupled to the content retransmitter 109. Accordingly, a user may use voice commands to control various functions of the content retransmitter 109 and any connected broadcast receivers 101 (such as by transmitting the executable commands to a connected broadcast receiver 101, which may execute the commands).

In one embodiment, the processing unit 122 of the broadcast receiver 101 (or the processing unit 174 of the content retransmitter 109) may be configured to execute the voice recognition algorithm 125 (or 175) in order to allow a user to change channels using voice commands. For illustrative purposes only, the user may speak the words "Channel Up," which may be recorded via the receiver 128. The processing unit 122 may then access the voice recognition algorithm 125 in the storage unit 124 to convert the received voice command into text. Once converted, the processing unit 122 may access one or more databases 123 storing one or more interpreted voice commands and corresponding executable commands to determine if there is a match between the text and one or the interpreted voice commands in the one or more databases 123. The processing unit 122 may then execute the executable commands corresponding to the matching interpreted voice command to change the channel. In another embodiment, the processing unit 122 of the broadcast receiver 101 may be similarly configured to process voice commands for changing the volume of the programming content being watched by a user. For example, a user may speak the words "Volume Up" or "Volume Down," and the processing unit 122 may execute the voice recognition algorithm 125 to convert the voice command into text, and access the one or more databases 123 in the storage unit 124 to look up the interpreted voice command matching the text and execute the associated executable commands.

The processing unit 174 of the content retransmitter 109 may be similarly configured to receive and process voice commands for changing channels. In one embodiment, the user may issue a spoken voice command, which may be recorded via the receiver 178 of the content retransmitter 109. The processing unit 174 may then access the voice recognition algorithm 175 in the one or more storage media 172 to convert the received voice command into text. Once converted, the processing unit 174 may access one or more databases 173 storing one or more interpreted voice commands and corresponding executable commands to determine if there is a match between the text and one or the interpreted voice commands in the one or more databases 173. If there is a match, the processing unit 174 may transmit the executable commands to the broadcast receiver 101, which may then execute the executable commands as described above.

In another embodiment, the storage media 172 of the content retransmitter 109 may not store the voice recognition algorithm 175 or the one or more databases 173 storing the interpreted voice commands and corresponding executable commands. In this embodiment, the content retransmitter 109 may receive the voice command via its local receiver 178, and may transmit the command to the broadcast receiver 101, which may access the voice recognition algorithm 125 stored in its local storage media 124 to perform voice recognition. In a further embodiment, the storage media 172 of the content retransmitter 109 may store a voice recognition algorithm 175, but may not store a database 173 storing the interpreted voice commands and corresponding executable commands. In this embodiment, the content retransmitter 109 may execute the voice recognition algorithm 175 to convert the spoken voice command into text, and may transmit the interpreted voice command (which may be a text file) to the broadcast receiver 101, which may access the database 123 in its local storage media 124 to determine the executable commands associated with the interpreted voice command.

In some embodiments, the broadcast receiver 101 may further be configured to provide feedback corresponding to the voice commands. For example, in one embodiment, the user may speak the words "What Channel?" and the processing unit 122 may access the voice recognition algorithm 125 and database 123 storing the interpreted voice commands and corresponding executable commands to execute commands to display the channel being viewed by the user. In another embodiment, the processing unit 122 may execute commands to emit an audio signal indicating the channel being viewed by the user. As another example, the user may speak the words "What is on?" and the processing unit 122 may execute commands to display program information (which can be the title of a program, a brief description of the program, the date on which the program was originally aired, and so on) regarding the programming content currently being viewed by the user.

In another embodiment, the processing unit 122 or the broadcast receiver 101 may be configured to display programming content based on a category spoken by a user. For example, the user may speak the words "Sports Programming," and the processing unit 122 may execute the voice recognition algorithm 125 to convert the spoken voice command into text, and access the database 123 storing the interpreted voice commands and corresponding executable commands. In this embodiment, the corresponding executable commands may cause the communication component 120 of the broadcast receiver 101 to receive programming information regarding sports-related programming content either currently being broadcast or scheduled for broadcast at a future time. For example, the processing unit 122 may access this information through an Electronic Program Guide received from the programming receiver 105. In another embodiment, the programming information may be obtained from the programming content itself. The processing unit 122 may then transmit a signal to the content device 113 to display text or graphics listing the available sports programming, or alternatively, may display a grid displaying all of the sports programming channels as currently being broadcast.

In a further embodiment, the processing unit 122 of the broadcast receiver 101 (or the processing unit 174 of the content retransmitter 109) may be configured to differentiate between different languages spoken by the user and interpret voice commands spoken in different languages. For example, the broadcast receiver 101 or the content retransmitter 109 may include multiple databases 123 (or 173), with each database 123 storing interpreted voice commands in a single language (as well as any corresponding executable commands). In other embodiments, the broadcast receiver 101 or the content retransmitter 109 may include one or more databases storing interpreted voice commands in different languages and their corresponding executable commands.

In one embodiment, the processing unit 122 may access the voice recognition algorithm 125 in the one or more storage media 124, which may be configured both to recognize the language spoken by the user and convert the received voice command into text. The voice recognition algorithm 125 may determine the language spoken by the user based on various features of the user's speech, such as the duration of various frequencies in the user's voice and/or patterns in variances in frequency as the user speaks. Upon determining the language spoken by the user, the processing unit 122 may access the database 123 corresponding to the language. For example, the storage unit 124 may include one database corresponding to commands spoken in English, and another database corresponding to commands spoken in French, Chinese, or some other language. The processing unit 122 may then execute the executable commands in the database 123 corresponding to the interpreted voice command (which may be a text file). In other embodiments, the processing unit 122 may not determine the language spoken by the user, but may simply convert the spoken words into text and access a single database storing voice commands in different languages. Other embodiments may be similarly configured to distinguish between different accents spoken by different users. For example, in one embodiment, the voice recognition algorithm may be configured to distinguish between American and British English.

The processing unit 122 may also be configured to display all or some of the available programming content that is in the language spoken by the user. In one embodiment, the processing unit 122 may execute the voice recognition algorithm 125 to determine the language spoken by the user and convert the voice command into text. The processing unit 122 may then access the one or more databases 123 to execute the corresponding executable commands. In this embodiment, the executable commands may cause the communication component 120 to access programming information regarding available programming content that is in the language spoken by the user. For example, the programming content may be programs that are either currently being broadcast or scheduled for broadcast at a future time. In one embodiment, the processing unit 122 may access the programming information through an Electronic Program Guide received through the communication component 120 from the programming receiver 105. In another embodiment, the programming information may be provided by the programming content itself. The processing unit 122 may then transmit a signal to the content device 113 to display text or graphics listing the available programming content, or alternatively, to display a grid displaying all of the available programming content as currently being broadcast.

In another embodiment, the processing unit 122 of the broadcast receiver 101 (or the processing unit 174 of the content retransmitter 109) may execute instructions stored in the storage unit 124 (or 172) to translate spoken words in the audio stream of the programming content into the language spoken by a user issuing voice commands. In this embodiment, the voice recognition algorithm 125 (or 175) may be configured to translate spoken words into multiple different languages. For example, the communication component 120 (or 170) of the broadcast receiver 101 or the content retransmitter 109 may receive the audio stream of the programming content from either the programming receiver 105 or from the broadcast receiver 101, and the processing unit 122 may execute the voice recognition algorithm to recognize the language spoken by the speaker in the audio stream either before, during, or after the audio stream is played by an associated content device 103(1) or 103(2). The audio stream may be transmitted by the programming receiver 105 (or the broadcast receiver 101) in an analog or a digital format, and may, in some embodiments, be compressed prior to transmission and decompressed by the receiving device. In another embodiment, the receiver 128 or 178 of the broadcast receiver 101 or content retransmitter 109 may be a microphone capable of picking up the audio stream as it is played through a speaker or other audio output device provided in or connected to the first content device. The audio stream may be transmitted in an analog or a digital format, and may, in some embodiments, be compressed prior to transmission.

The processing unit 122 (or 174) may then translate the spoken words in the audio stream of the programming content into text, as described above, with the text being in the language spoken by the speaker. The text may then be converted into a translated audio stream that is in the same language as the language spoken by the user, and transmitted by the broadcast receiver 101 to a content device 103(1) (or by the content retransmitter 109 to a content device 103(2)), which may play the translated audio stream with the programming content. In some embodiments, the translated audio stream may replace the original audio stream of the programming content. In another embodiment, the text may be transmitted by the broadcast receiver 101 (or the content retransmitter 109) to the content device 103(1) (or 103(2) and displayed on the display device 162, for example, in the form of a subtitle.

In another embodiment, the processing unit 122 may be configured to distinguish between the words spoken by the user and words spoken by speakers captured in the programming content and displayed by the content device 113. This embodiment may prevent the processing unit 122 from executing commands in response to sounds transmitted by the content device. In one embodiment, the voice recognition algorithm 125 may be configured to distinguish between different speakers. In this embodiment, the storage device may include a database of recognized speakers, and execution of the algorithm by the processing unit 122 may produce the identity of a speaker. Once the speaker is identified, the processing unit 122 may convert the voice command to text and execute the executable commands corresponding to the interpreted voice command. In an alternative embodiment, the voice recognition algorithm may be configured to recognize a spoken code. For example, the code may be a series of numbers or letters, or a word. In this embodiment, the processing unit 122 may only perform speech recognition on the received voice commands if the code is received by the receiver 128 prior, after, or during the voice command. In other embodiments, the broadcast receiver 101 may have separate modes. In one mode, the user may program the broadcast receiver to perform voice recognition on any sound, regardless of its source or whether a spoken code is received. In another mode, the user may program the broadcast receiver to perform voice recognition only if a spoken code is received, or if the processing unit 122 recognizes the speaker.

Figure 2:
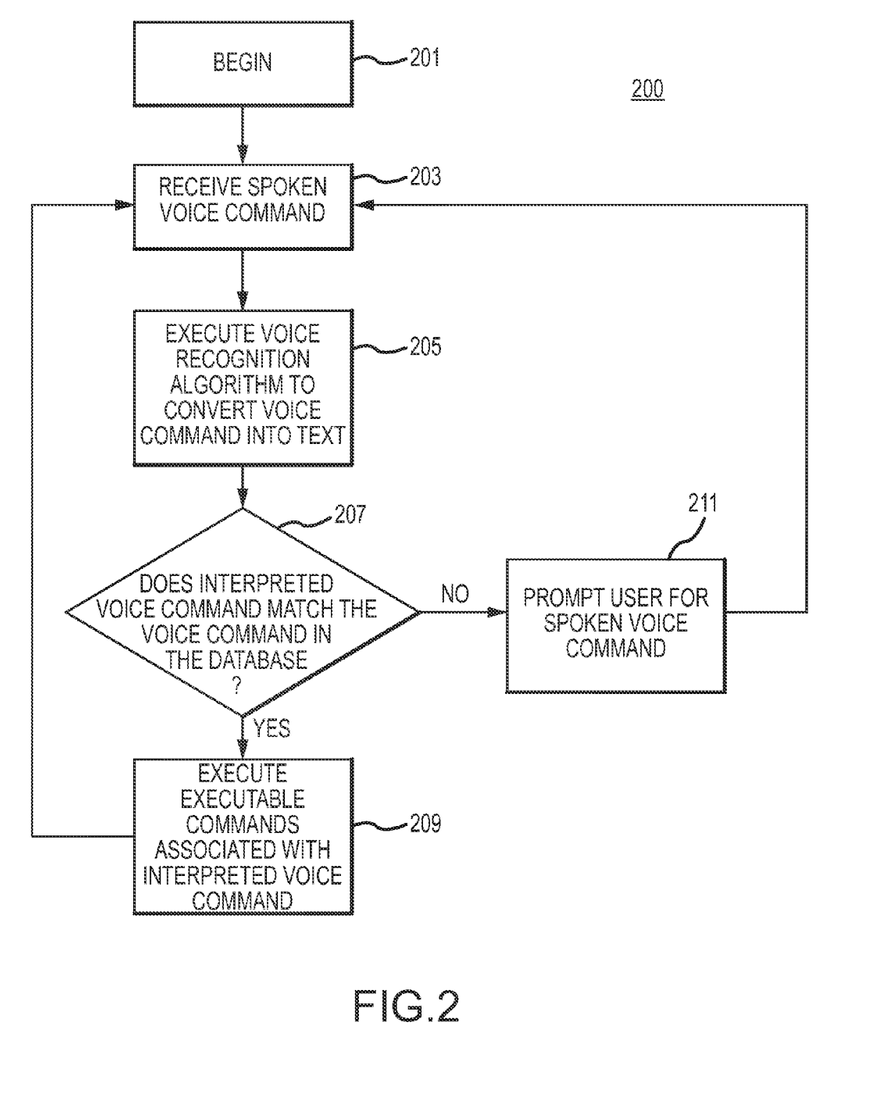
FIG. 2 is a flow chart illustrating one embodiment of a method for controlling an electronic device using a voice command. This method may be performed by the system of FIG. 1.

FIG. 2 illustrates one embodiment of a method 200 for controlling an electronic device using a voice command. The method 200 may be performed by the broadcast receiver 101 or the content retransmitter 109 of FIG. 1. The flow begins at block 201 and proceeds to block 203, where the broadcast receiver 101 or the content retransmitter 109 receives a spoken voice command via a receiver. The receiver may be an audio receiver, such as a microphone. The flow then proceeds to block 205, where the broadcast receiver 101 or the content retransmitter 109 may execute a voice recognition algorithm to convert the voice command into text. As discussed above, the algorithm may be stored in a local storage device and accessed by the processing unit of either the broadcast receiver 101 or the content retransmitter 109. The flow then proceeds to block 207, in which the broadcast receiver 101 or the content retransmitter 109 may determine whether the interpreted voice command matches a voice command stored in a database. As discussed above, the database may be stored in the local storage device of either the broadcast receiver 101 or content retransmitter 109. In one embodiment, the database may be a relational database that links one or more text files corresponding to the interpreted voice commands to one or more executable commands. If, in block 207, the broadcast receiver 101 or the content retransmitter 109 determines that the text derived from the voice recognition algorithm matches the text of an entry in the database then, in block 209, the broadcast receiver 101 or the content retransmitter 109 may access the executable commands associated with matching entry. The flow may then revert to block 203, in which the broadcast receiver 101 or the content retransmitter 109 may receive another spoken voice command. If, however, in block 207, the broadcast receiver 101 or the content retransmitter 109 does not match the text of an entry in the database, then the flow proceeds to block 211, in which the broadcast receiver 101 or the content retransmitter 109 may prompt the user for another spoken voice command. For example, this may be accomplished by transmitting an audio signal or text to display to the user.

Figure 3:
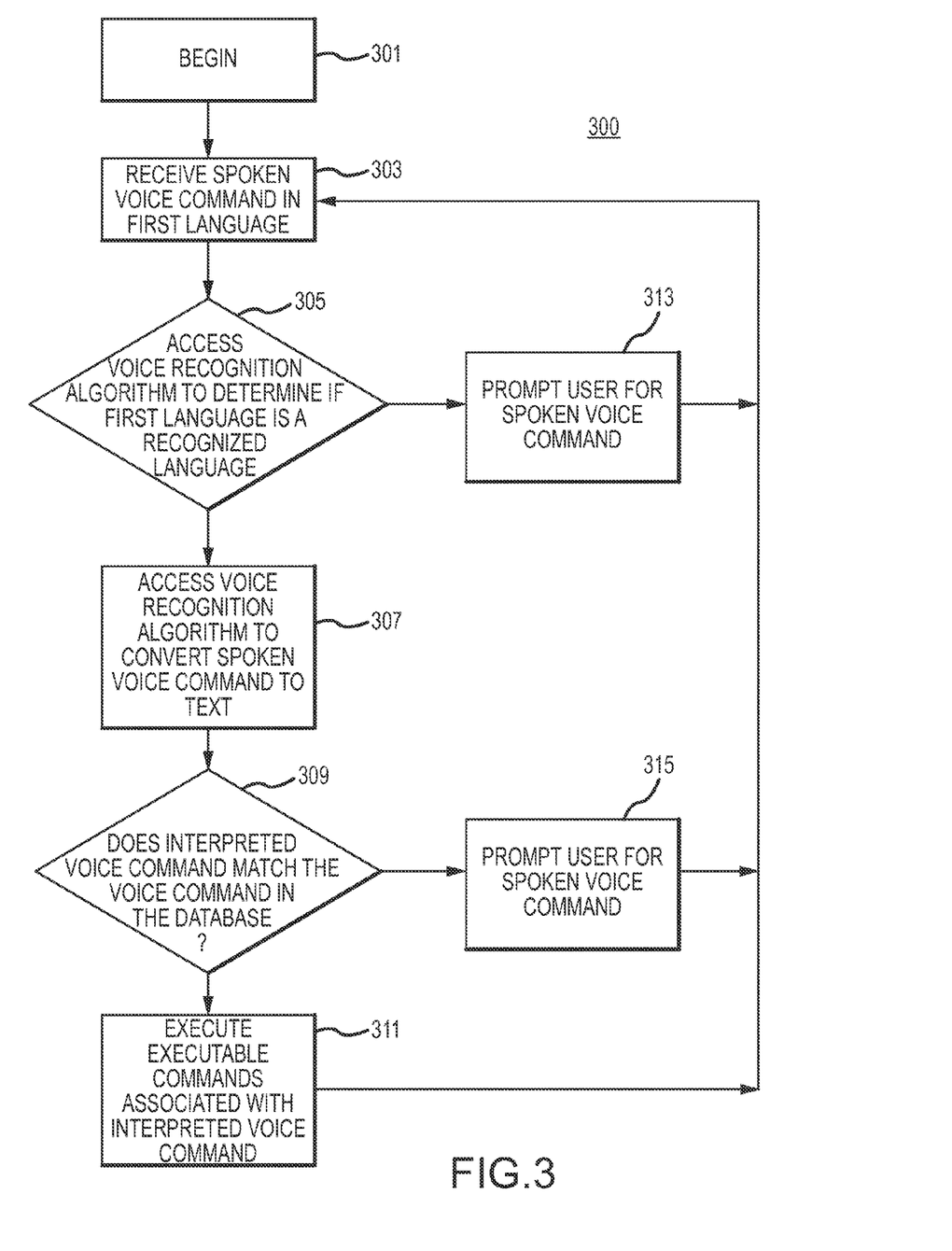
FIG. 3 is a flow chart illustrating another embodiment of a method for controlling an electronic device using a voice command. This method may be performed by the system of FIG. 1.

FIG. 3 illustrates another embodiment of a method 300 for controlling an electronic device using a voice command. The method 300 may be performed by the broadcast receiver 101 or the content retransmitter 109 of FIG. 1. The flow begins at block 301 and proceeds to block 303, where the broadcast receiver 101 or the content retransmitter 109 may receive a spoken voice command in a first language. The flow then proceeds to block 305, where the broadcast receiver 101 or the content retransmitter 109 may access the voice recognition algorithm to determine if the first language spoken by the user is a recognized language. In one embodiment, the voice recognition algorithm may be based on various features of the user's speech, such as the duration of various frequencies of the user's voice and/or patterns in variances in frequency as the user speaks. If, in block 305, the broadcast receiver 101 or the content retransmitter 109 determines that the first language spoken by the user is not a recognized language, then the flow proceeds to block 313, in which the user may be prompted for a spoken voice command.

If, in block 305, the broadcast receiver 101 or the content retransmitter 109 determines that the first language spoken by the user is a recognized language, then the flow proceeds to block 307, where the broadcast receiver 101 or content receiver 109 may access the voice recognition algorithm to convert the spoken voice command to text. The flow then proceeds to block 309, in which the broadcast receiver 101 or the content retransmitter 109 may determine if the interpreted voice command matches a voice command stored in a database. If, in block 309, the broadcast receiver 101 or the content retransmitter 109 determines that there is a match between the interpreted voice command and a voice command stored in the database, then the flow proceeds to block 311, where the broadcast receiver 101 may execute the executable commands associated with the matching voice command stored in the database. If, in block 309, the broadcast receiver 101 or content retransmitter 109 determines that there is no match between the interpreted voice command and a voice command stored in the database, then, in block 315, the broadcast receiver 101 or the content retransmitter 109 may prompt the user for a spoken voice command. As discussed above, this may be accomplished by transmitting a display or audio signal to a content device 113.

Figure 4:
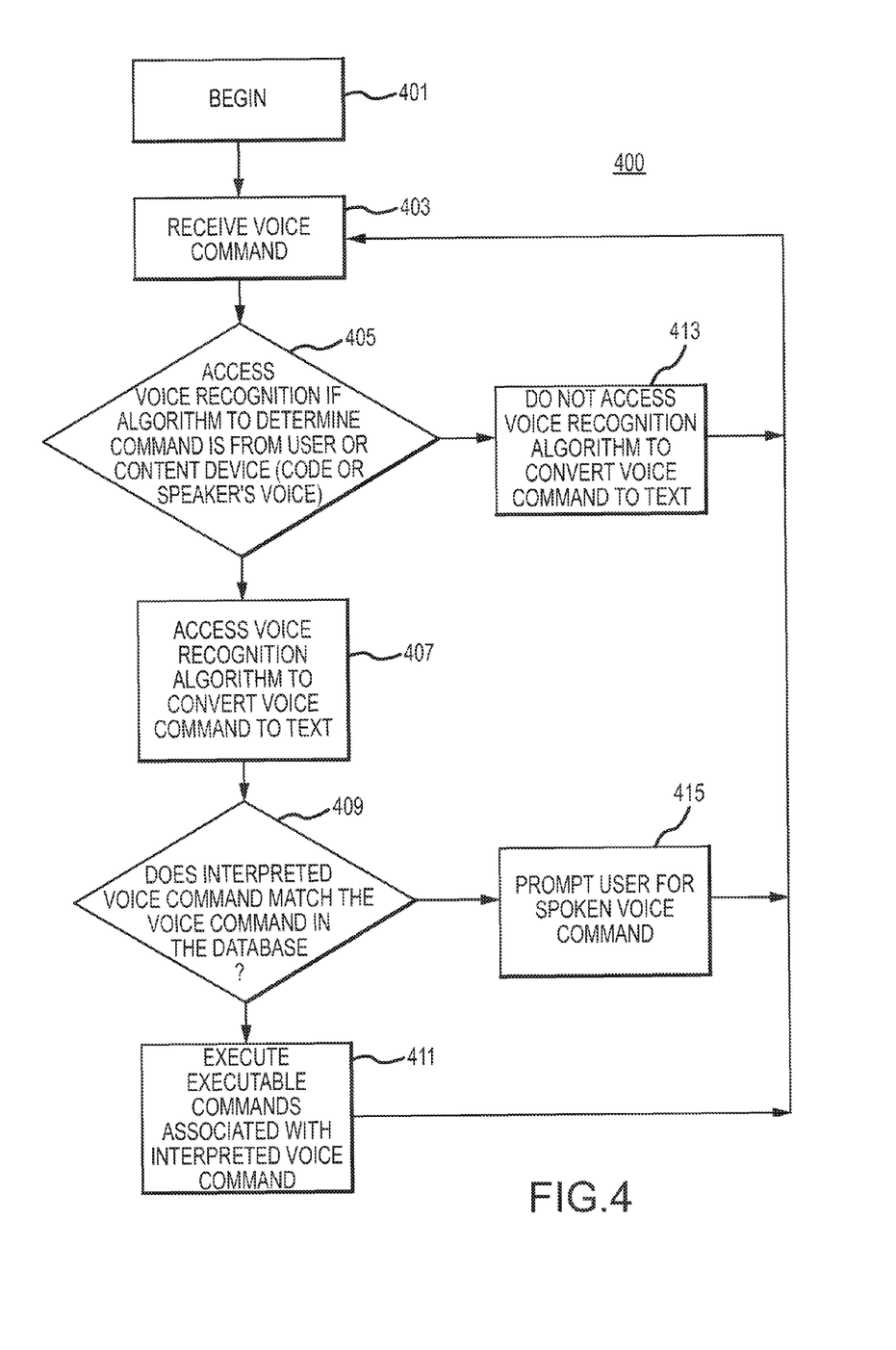
FIG. 4 is a flow chart illustrating another embodiment of a method for controlling an electronic device using a voice command. This method may be performed by the system of FIG. 1.

FIG. 4 illustrates another embodiment of a method 400 for controlling an electronic device using a voice command. The method 400 may be performed by the broadcast receiver 101 or the content retransmitter 109 of FIG. 1. The flow begins at block 401 and proceeds to block 403, where the broadcast receiver 101 or the content retransmitter 109 may receive a voice command. The flow then proceeds to block 405, where the broadcast receiver 101 or the content retransmitter 109 may access the voice recognition algorithm to determine if the spoken voice command is from the user, or if the command was issued by a content device communicatively coupled to the broadcast receiver 101 or the content retransmitter 109. As discussed above, in one embodiment, this may be accomplished by detecting a code that may be spoken by the user prior, after, or during the voice command. In another embodiment, this may be accomplished by executing a voice recognition algorithm to recognize the speaker's voice. In one embodiment, the voice recognition algorithm may be based on various features of the user's speech, such as the duration of various frequencies of the user's voice and/or patterns in variances in frequency as the user speaks. If, in block 405, the broadcast receiver 101 or the content retransmitter 109 determines that the command was issued by a content device communicatively coupled to the broadcast receiver, then the flow proceeds to block 413, in which the broadcast receiver 101 or the content retransmitter 109 may not access a voice command algorithm to convert the voice command into text.

If, in block 405, the broadcast receiver 101 or the content retransmitter 109 determines that the command was issued by the user, then the flow proceeds to block 307, where the broadcast receiver 101 or content receiver 109 may access the voice recognition algorithm to convert the spoken voice command to text. The flow then proceeds to block 349, in which the broadcast receiver 101 or the content retransmitter 109 may determine if the interpreted voice command matches a voice command stored in a database. If, in block 409, the broadcast receiver 101 or the content retransmitter 109 determines that there is a match between the interpreted voice command and a voice command stored in the database, then the flow proceeds to block 411, where the broadcast receiver 101 may execute the executable commands associated with the matching interpreted voice command stored in the database. If, in block 409, the broadcast receiver 101 or content retransmitter 109 determines that there is no match between the interpreted voice command and a voice command stored in the database, then, in block 415, the broadcast receiver 101 or the content retransmitter 109 may prompt the user for a spoken voice command. As discussed above, this may be accomplished by transmitting a display or audio signal to a content device 103.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for translating an audio stream of programming content, the system comprising: an apparatus, comprising:
   a processing unit configured to execute a voice recognition algorithm and one or more executable commands;
   a communication component coupled to the processing unit and configured to receive programming content comprising an audio stream in a second language;
   a receiver coupled to the processing unit and configured to:
      output the audio stream in the second language while receiving a voice command;
      determine, using the voice recognition algorithm, whether the voice command is from a user or from the audio stream; and
      determine, using the voice recognition algorithm, whether the voice command is in a first language that does not match the second language if the voice command is from the user;
   and
   one or more storage media storing the voice recognition algorithm, the voice recognition algorithm being configured to translate the audio stream into a first language if the voice command is from the user and the first language does not match the second language.

2. The system of claim 1, wherein the processing unit is configured to transmit the translated audio stream to an output device.

3. The system of claim 2, wherein the processing unit is further configured to determine whether the text matches one or more voice command entries in a database stored in the one or more storage media, the one or more voice command entries each including an interpreted voice command file and one or more executable commands associated with the interpreted voice command file.

4. The system of claim 1, wherein the voice recognition algorithm is configured to convert the audio stream into text.

5. The system of claim 1, wherein, if the first language matches the second language, the voice recognition algorithm does not translate the audio stream.

6. The system of claim 1, further comprising a content device coupled to the apparatus, the content device comprising a speaker configured to output the audio stream.

7. The system of claim 1, wherein the apparatus comprises a content retransmitter.

8. The system of claim 1, wherein the apparatus comprises a broadcast receiver.

9. A method for translating an audio stream of programming content, comprising:
   receiving a first voice command;
   receiving programming content including a first audio stream in a second language;
   outputting the first audio stream in the second language while receiving the first voice command;
   determining, using a voice recognition algorithm, whether the first voice command is from a user or from the first audio stream;
   determining, if the voice command is from the user, if the voice command is in a first language that does not match the second language; and
   executing the voice recognition algorithm to translate the first audio stream into the first language if the voice command is from the user and the first language does not match the second language.

10. The method of claim 9, wherein the voice recognition algorithm is configured to translate the first audio stream into text.

11. The method of claim 10, further comprising transmitting the text to a content device.

12. The method of claim 10, further comprising generating a second audio stream from the text.

13. The method of claim 12, further comprising transmitting the second audio stream to a content device.

14. The method of claim 13, further comprising replacing the first audio stream with the second audio stream.

15. A computer program product, comprising:
- a first set of instructions, stored in at least one non-transitory machine-readable medium, executable by at least one processing unit to receive a voice command from a receiver;
- a second set of instructions, stored in the at least one non-transitory machine-readable medium, executable by the at least one processing unit to receive an audio stream in a second language from a communication component, the second set of instructions further executable to output the audio stream in the second language while receiving the voice command;
- a third set of instructions, stored in the at least one non-transitory machine-readable medium, executable by the at least one processing unit to determine, using a voice recognition algorithm, whether the voice command is from a user or from the audio stream and to determine whether the voice command is in a first language that does not match the second language if the voice command is from the user; and
- a fourth set of instructions, stored in the at least one non-transitory machine-readable medium, executable by the at least one processing unit to translate the audio stream into the first language if the voice command is from the user and the first language does not match the second language.

16. The computer program product of claim 15, further comprising:
- a fifth set of instructions, stored in the at least one non-transitory machine-readable medium, executable by the at least one processing unit to determine one or more executable commands corresponding to the voice command.

17. The computer program product of claim 15, further comprising:
- a fifth set of instructions, stored in the at least one non-transitory machine-readable medium, executable by the at least one processing unit to translate the audio stream into text.

18. The computer program product of claim 17, further comprising:
- a sixth set of instructions, stored in the at least one non-transitory machine-readable medium, executable by the at least one processing unit to transmit the text to a content device.

19. The computer program product of claim 15, further comprising:
- a fifth set of instructions, stored in the at least one non-transitory machine-readable medium, executable by the at least one processing unit to transmit the translated audio stream to a content device.

* * * * *